United States Patent [19]

Choka

[11] Patent Number: 4,935,886
[45] Date of Patent: Jun. 19, 1990

[54] PLANT CONTROL SYSTEM INCLUDING PLANT OPERATION SIMULATOR

[75] Inventor: Minoru Choka, Fuchu, Japan

[73] Assignee: Kabushiki Kaisha Toshiba, Japan

[21] Appl. No.: 173,453

[22] Filed: Mar. 25, 1988

[30] Foreign Application Priority Data

Mar. 25, 1987 [JP] Japan .................................. 62-69197

[51] Int. Cl.⁵ .......................... G05B 17/00; G09B 9/00
[52] U.S. Cl. .................................... 364/578; 364/146; 364/149
[58] Field of Search .............................. 364/149-151, 364/578, 146

[56] References Cited

U.S. PATENT DOCUMENTS

| | | | |
|---|---|---|---|
| 3,936,885 | 2/1976 | Mutafeliya | 364/300 |
| 4,042,813 | 8/1977 | Johnson | 364/578 |
| 4,385,349 | 5/1983 | Ashford et al. | 364/578 |
| 4,512,747 | 4/1985 | Hitchens et al. | 364/578 |
| 4,555,756 | 11/1985 | Yamanaka | 364/578 |
| 4,604,718 | 8/1986 | Norman et al. | 364/578 |
| 4,613,952 | 9/1985 | McClanahan | 364/578 |

Primary Examiner—John R. Lastova
Attorney, Agent, or Firm—Foley & Lardner, Schwartz, Jeffery, Schwaab, Mack, Blumenthal & Evans

[57] ABSTRACT

A plant control system having a plant operation simulator, including an actual plant operation control system and a controller for controlling a simulation of a plant operation in a state that at least a partial function of the actual plant operation control system is off-line. The plant operation control system includes a controller for controlling the plant operation, a process input-output device, a central processing device, an operation desk and a data transmission device.

7 Claims, 5 Drawing Sheets

PLANT CONTROL SYSTEM INCLUDING PLANT OPERATION SIMULATOR

BACKGROUND OF THE INVENTION

1. Field of the Invention

The present invention relates to a plant control system including a plant operation simulator, using a data transmission device, which is capable of conducting a training for a plant operation and the like.

2. Description of the Prior Art

In a conventional plant control system, a central processing unit for conducting an operation for a plant control, a programable controller for controlling a plant, a process input-output device for connecting to a variety of actuators and sensors of the plant, a display for showing a plant operation, an operation desk are connected to one another through a data transmission device, and an operator on the operation desk operates the above members of the system to carry out the plant control.

However, in the conventional plant control system, the actuators are driven in a predetermined manner by a sequence control in accordance with the operation of the operation desk, and hence it is difficult to use the control system for conducting a training for the plant operation from a viewpoint of safety, economy and so forth since a danger is apt to happen in the actions of the actuators or a large energy is spent during the actual operation of the plant.

Usually, the training for the plant operation has been carried out by a plant simulator separate from the actual plant. However, no matter how good simulator is designed, there are many differences between the actual plant and the simulator, and the quality of the training effects is necessarily lowered. Further, the better training effects are expected, the more cost is necessary. Accordingly, the training for the plant operation has been sometimes practiced by using the actual plant. However, in this case, since the plant is operated during the training, an unexpected accident may occur even when a sufficient consideration has been paid in the operation, in advance.

In the prior art, a training equipment or method for the plant operation, satisfying the safety, the economy and the good training effects cannot be realized.

SUMMARY OF THE INVENTION

Accordingly, it is an object of the present invention to provide a plant control system including a plant operation simulator, free from the aforementioned disadvantages and defects of the prior art, which utilizes an actual plant control system and which is capable of conducting a training for a plant operation and the like without operating a plant.

It is another object of the present invention to provide a plant control system including a plant operation simulator, which is capable of conducting a training for a plant operation in a safe and economical manner with good training effects.

In accordance with one aspect of the present invention, there is provided a plant control system including a plant operation simulator, comprising an actual plant operation control system and control means for controlling a simulation of a plant operation in a state that at least a partial function of the actual plant operation control system is in an off-line.

In accordance with another aspect of the present invention, there is provided a plant control system including a plant operation simulator, comprising first control means for controlling a plant operation, second control means for controlling a simulation of the plant operation in a state that at least a partial function of the plant control system is in an off-line, process input-output means for feeding input and output signals between the first control means and a plant, central processing means for conducting operations of the plant operation and the simulation of the plant operation and for feeding operated results to the first and second control means, an operation desk for operating the plant operation and the simulation of the plant operation, and data transmission means for transmitting signals from one to another of the first control means, the second control means, the process input-output means, the central processing means and the operation desk.

BRIEF DESCRIPTION OF THE DRAWINGS

These and other objects, features and advantages of the present invention will more fully appear from the following description of the preferred embodiment with reference to the accompanying drawings, in which.

DESCRIPTION OF THE PREFERRED EMBODIMENT

Figure 1:
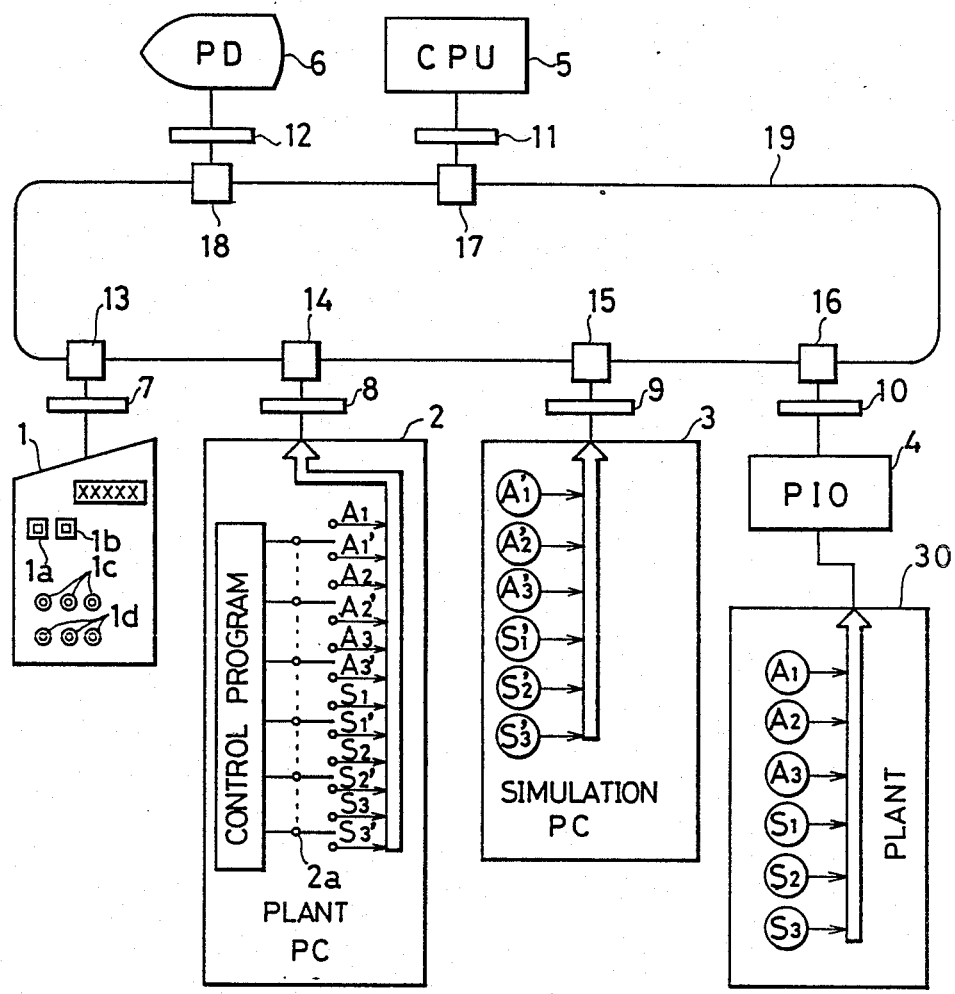
FIG. 1 is a block diagram of a plant control system including a plant operation simulator according to the present invention.

Referring now to the drawings, wherein like reference characters designate like or corresponding parts throughout the several views, there is shown in FIG. 1 one embodiment of a plant control system including a plant operation simulator according to the present invention.

In the drawing, the plant control system including the plant operation simulator for controlling a plant 30 including actuators $A_1$, $A_2$, $A_3$ such as drive motors and the like, and sensors $S_1$, $S_2$, $S_3$ such as pressure switches and the like, comprises an operation desk 1, a programable controller 2, hereinafter referred to as PC 2, for controlling a plant operation, a PC 3 for controlling a simulation of the plant operation, a process input-output device 4, hereinafter referred to as PIO 4, a central processing unit 5, hereinafter referred to as CPU 5, for conducting an operation for the plant control and the simulation control, a programable display 6, hereinafter referred to as PD 6, address converters 7 to 12 connected to the the operation desk 1, the plant PC 2, the simulation PC 3, the PIO 4, the CPU 5, and the PD 6, respectively, and a close coupling data transmission device composed of transmission control devices 13 to 18 connected to the address converters 7 to 12, respectively, and a transmission loop 19 coupling the transmission control devices 13 to 18 to one another.

In this plant control system, the operation desk 1, the plant PC 2, the simulation PC 3, the PIO 4, the CPU 5, the PD 6, the address converters 7 to 12, the transmission control devices 13 to 18 and the transmission loop 19 constitute main members or components of an actual plant control system for controlling an operation of a plant.

In this embodiment, the operation desk 1 having a plant push switch 1a, a simulation push switch 1b, ON and OFF switches 1c and 1d for the actuators of the plant, joy sticks and so forth, is operated by an operator for controlling the plant operation and the simulation of the plant operation. The plant PC 2 including a control program for controlling the plant operation and a turn switch 2a for selecting a plant operation mode or a simulation mode of the plant operation performs a sequence control for the plant operation. A suitable number of the plant PC 2 are provided depending on the scale of the plant 30 when one PC 2 is not sufficient in its capacity.

The simulation PC 3 including a control program for the simulation of the plant operation, dummy or simulative actuators $A_{1'}$, $A_{2'}$, $A_{3'}$ corresponding to the respective actuators $A_1$, $A_2$, $A_3$ of the plant, and dummy or simulative sensors $S_{1'}$, $S_{2'}$, $S_{3'}$ corresponding to the respective sensors $S_1$, $S_2$, $S_3$ of the plant, simulates these actuators and sensors of the plant connected to the PIO 4 when performing the simulation of the plant operation. The simulation PC 3 uses a PC having the same function as the plant PC 2, and thus a backup PC for the plant PC 2 upon its trouble or accident may be used for the simulation PC 3.

The PIO 4 connected to the actuators $A_1$, $A_2$, $A_3$ and the sensors $S_1$, $S_2$, $S_3$ of the plant 30 conducts inputting and outputting of the signals between those of the plant 30 and the plant PC 2 or other members via the data transmission device. The CPU 5 generally controls the entire system. For example, the CPU 5 operates the desired control values and feeds operated results to the plant PC 2. The PD 6 having a CRT scope displays the plant operation or the simulation of the plant operation according to the conditions which are programably determined.

Figure 2:
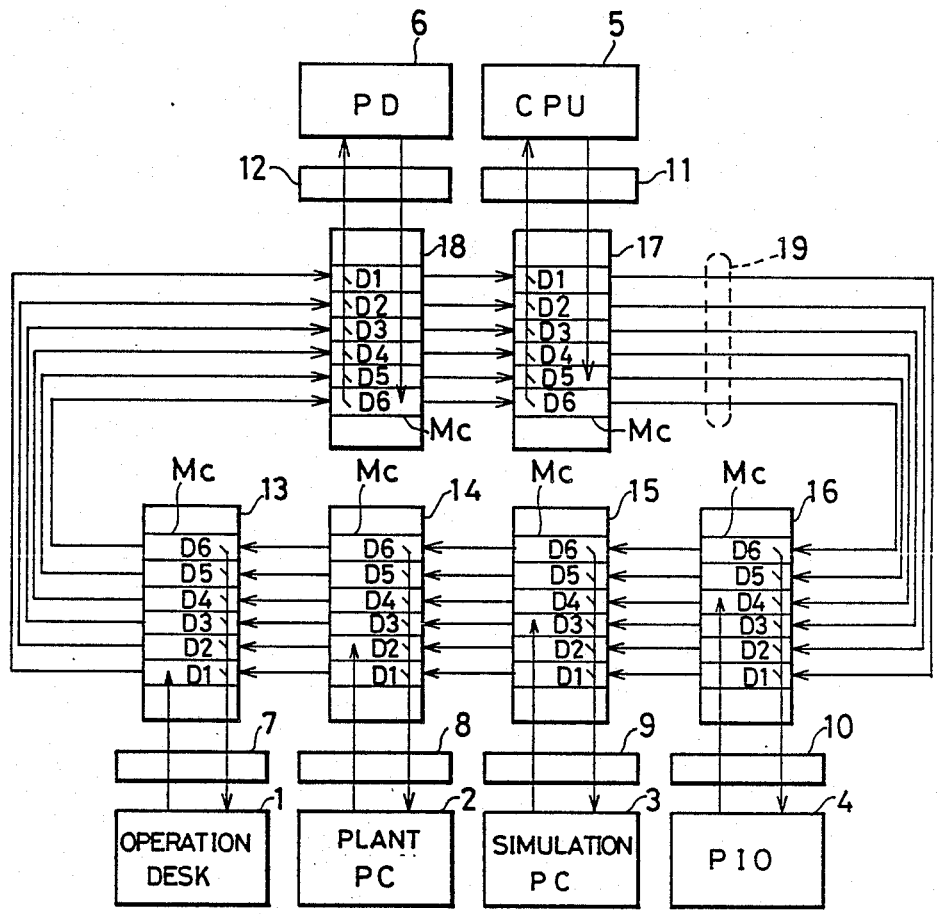
FIG. 2 is a schematic explanatory diagram of a close coupling data transmission device used in the control system of FIG. 1.

In FIG. 2, there is shown the close coupling data transmission device including the transmission control devices 13 to 18 and the transmission loop 19 connecting the transmission control devices 13 to 18.

As shown in FIG. 2, each of the transmission control devices 13 to 18 includes a common memory Mc having data areas D1 to D6 corresponding to the operation desk 1, the plant PC 2, the simulation PC 3, the PIO 4, the CPU 5 and the PD 6, respectively. In the common memory Mc of each of the transmission control devices 13 to 18, the data output from each of the members 1 to 6 can be written in the corresponding area of the data areas Di (D1 to D6), and the data stored in the entire areas D1 to D6 can be optionally read out. The data stored in the common memory Mc of each of the transmission control devices 13 to 18 is cyclically transmitted to the adjacent common memory Mc at a high speed via the transmission loop 19.

In the close coupling data transmission device, since the newest information of the entire system is stored in the common memory Mc of each of the transmission control devices 13 to 18, by reference to the own common memory Mc, each of the members 1 to 6 can receive instructions given from the other members 1 to 6 and send certain instructions to the other members 1 to 6.

Figure 3:
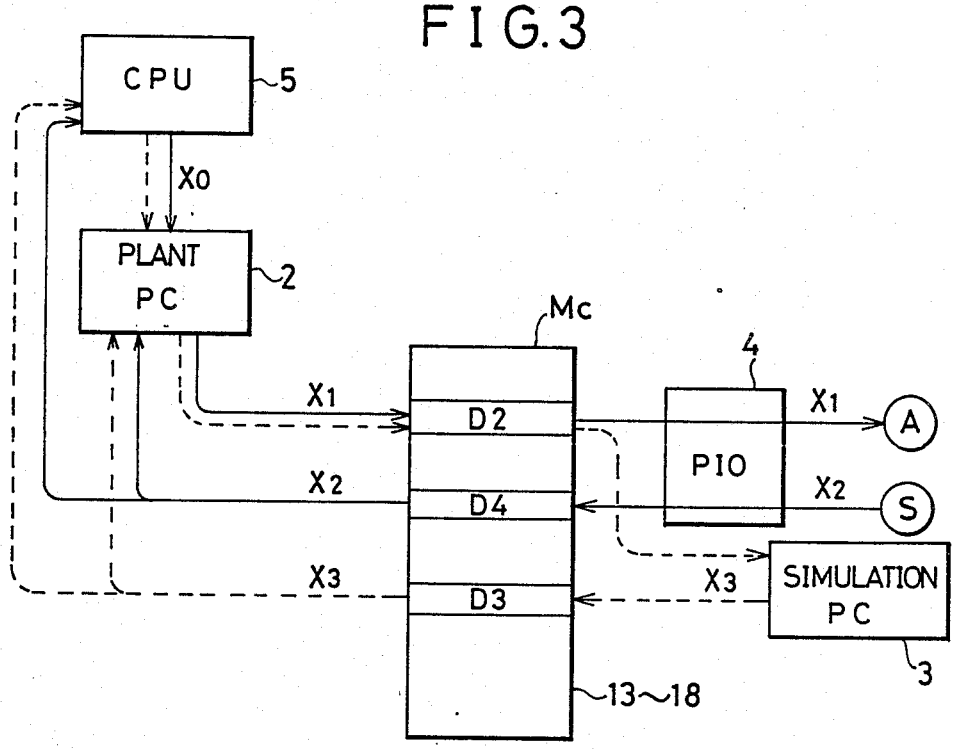
FIG. 3 is a block diagram for explaining a flow of data of the control system of FIG. 1.

FIG. 3 is a schematic diagram for explaining the data transmission in the actual plant operation mode and the simulation mode of the plant operation. Solid lines indicate flows of the data in the actual plant operation mode, and broken lines show flows of the data in the simulation or training mode.

Firstly, in the actual plant operation mode, a desired value $X_0$ output from the CPU 5 is transmitted to the plant PC 2 via the data transmission device, and then a control signal $X_1$ is output from the plant PC 2 to the data area D2 of its own common memory Mc. Then, the control signal $X_1$ *is fed to the predetermined actuator A of the plant 30 via the PIO 4, and a detection signal output from the sensor S of the plant 30 is written in the data area D4 of the common memory Mc of the PIO 4 as a feed back signal* $X_2$. The feed back signal $X_2$ is then returned to the plant PC 2 and the CPU 5. Hence, an address used for the signal of the actuator A is different from an address used for the signal of the sensor S in the common memories Mc.

On the other hand, in the simulation or training mode of the plant operation, the desired value $X_0$ output from the CPU 5 is fed to the plant PC via the data transmission device and the control signal $X_1$ is then written into the data area D2 of the common memory Mc for the CPU 5 in the same manner as the plant operation mode. However, in the simulation mode, the data in the data area D2 of the common memory Mc is not read out by the PIO 4 but is read out by the simulation PC 3, and then the simulation PC 3 writes a simulated result of the actuator A of the plant into the data area D3 of the common memory Mc of the simulation PC 3 as another feed back signal $X_3$. Then, the feed back signal $X_3$ is returned to the plant PC 2 and the CPU 5.

Next, an operation of the simulation of the plant operation will be described in detail with reference to FIGS. 4 and 5.

Figure 4:
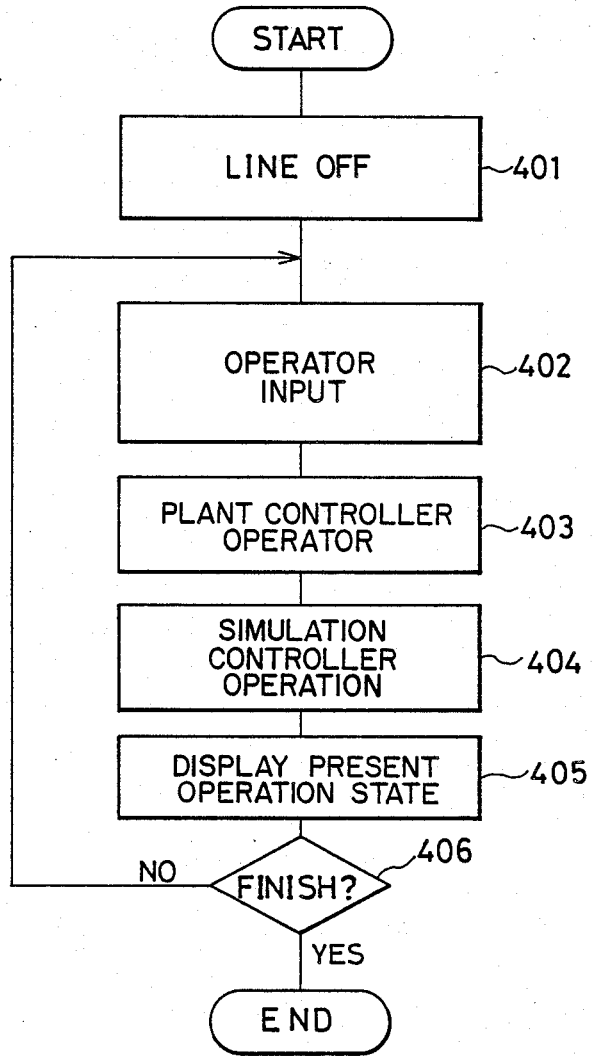
FIG. 4 is a flow chart of a simulation mode of the control system of FIG. 1.
Figure 5:
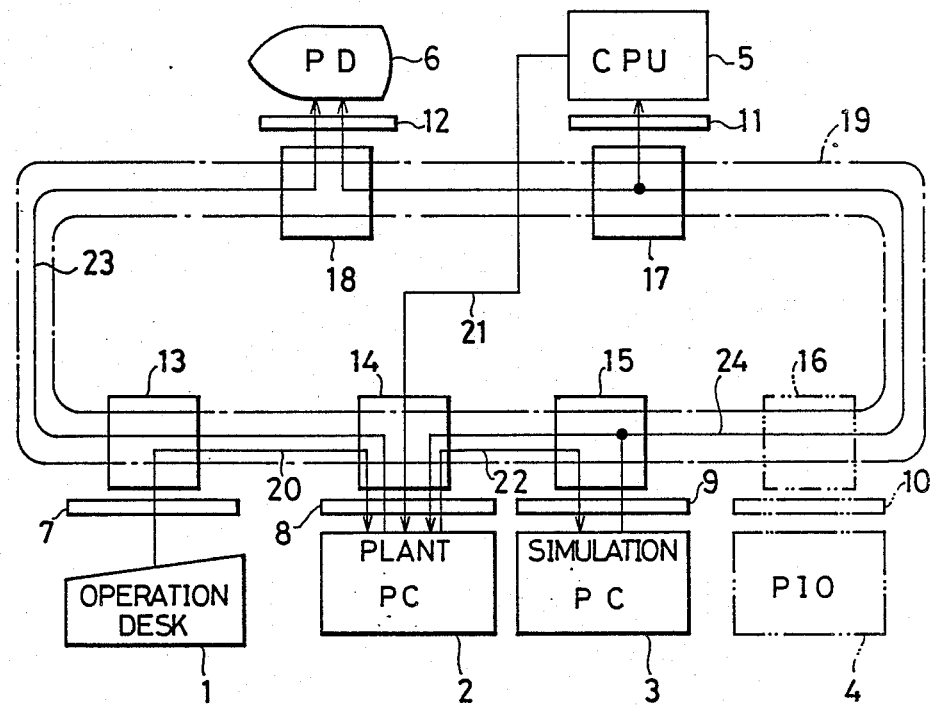
FIG. 5 is a schematic diagram for explaining a simulation operation of the control system of FIG. 1.

In FIG. 4, first, in a step 401, in order to stop the operation of the plant 30, an electric power source for machinery and tools of the plant 30 is switched off. That is, the input-output devices such as the actuators and sensors of the plant are in the off-line state. Then, in order to turn from the plant operation mode to the simulation mode, the simulation switch 1b of the operation desk 1 is pushed on. Thus, the plant PC 2 switches the connections for the input and output signals from the plant 30 to the simulation PC 3. That is, in FIG. 1, the turn switch 2a of the plant PC 2 changes the connections from the actuators $A_1$, $A_2$, $S_3$ and the sensors $S_1$, $S_2$, $S_3$ of the plant 30 to the simulative actuators $A_{1'}$, $A_{2'}$, $A_{3'}$ and the simulative sensors $S_{1'}$, $S_{2'}$, $S_{3'}$ of the simulation PC 3. Then, according to this mode change, automatically, the members 2, 3, 4, 5 and 6 are changed from the plant operation mode to the simulation mode. That is, the PIO 4 is in the off-line state, the simulation PC 3 is in the on-line state, the access of the data area D4 of the plant PC 2 and the CPU 5 is changed to the data area D3, and the access to the PIO 4 of the PD 6 is changed to the simulation PC 3.

In this embodiment, for the safety, when the plant operation mode is changed to the simulation mode, in order to prevent the drive of the machinery and tools of the plant by remained operation signals, a countermeasure program is preferably set in the plant PC 2, in advance.

Then, in a step 402, an operator confirms the simulation mode and operates the simulation of the plant operation. In this time, a lamp of the simulation mode button may be lighted. The operator operates the simulation operation similar to the actual plant operation while watching the operation data of the plant, displayed on the PD 6. As shown in FIG. 5, an operation signal 20 is fed to the plant PC 2 via the common memories Mc of the data transmission device.

In a step 403, the plant PC 2 performs the control, as shown in FIG. 3, on the basis of a setting signal 21 of the desired control value such as a pressure, a load, a flow amount and so forth, fed from the CPU 5, and outputs a control signal 22 to the simulation PC 3 via the common memories Mc and a display signal 23 to the PD 6 via the common memories Mc.

In a step 404, the simulation is conducted in the simulation PC 3, and the simulation PC 3 outputs a simulated result signal 24 such as a moving amount and the like to the plant PC 2, the CPU 5 and the PD 6 via the common memories Mc.

In a step 405, the PD 6 displays the present operation state in accordance with the signals 23 and 24.

The steps 402 to 405 are repeated until an finish order is given in a step 406.

When the simulation is finished, by pushing the plant switch 1a of the operation desk 1, the simulation mode is changed to the plant operation mode in the system. Then, the plant PC 2 switches the connection of the input and output signals from the simulation PC 3 to the plant 30. That is, the turn switch 2a of the plant PC 2 changes the connections from the simulative actuators $A_{1'}$, $A_{2'}$, $A_{3'}$ and the simulative sensors $S_{1'}$, $S_{2'}$, $S_{3'}$ of the simulation PC 3 to the actuators $A_1$, $A_2$, $A_3$ and the sensors $S_1$, $S_2$, $S_3$ of the plant 30. Then, the members 2, 3, 4, 5 and 6 are automatically changed from the simulation mode to the plant operation mode. That is, the PIO 4 is in the on-line state, the simulation PC 3 is in the off-line state, the access of the data area D3 of the plant PC 2 and the CPU 5 is changed to the data area D4, and the access to the simulation PC 3 of the PD 6 is changed to the PIO 4.

Then, after confirming the safety, the electric power source for the machinery and tools of the plant 30 is switched on, thereby starting again the plant operation in a regular manner.

It is readily understood from the above description of the preferred embodiment that, in addition that, of course, the actual plant operation can be normally carried out without any trouble, the simulation can be safely and economically conducted, for instance, for the training of the plant operation, without actually driving the actuators of the plant in the simulation mode, as shown in FIG. 4.

According to the present invention, since the training can be performed using the actual operation desk 1 while looking over the plant, and the actual control programs of the plant PC 2 and the CPU 5 can be operated, the maximum ambience can be realized to obtain the superior training effects which can be never obtained in the conventional simulator. Further, when the simulation is carried out, the plant is in the off-line state, and hence the maintenance and inspection of the machinery and tools of the plant can be conducted during the simulation in the same time. That is, the off-line period of the plant can be efficiently used.

Although the data area D3 of the common memory Mc for the simulation PC 3 is provided apart from the data area D4 of the common memory Mc for the PIO 4 in the preferred embodiment, only one of the data areas D3 and D4 may be provided, and the one data areas is alternately used for the simulation PC 3 or the PIO 4 by completely switching the simulation PC 3 and the PIO 4.

According to the present invention, since the simulation programable controller for simulating the process input-output device whose partial or entire function may be in the off-line state, is provided, and the main members of the system are connected to one another by the close coupling data transmission device, only the actuators which may be apt to be dangerous, or have an economical problem, or have some inconvenience upon driving, may be in the off-line state, and the simulation PC may simulate only the off-lined actuators. In this case, since the close coupling data transmission device includes the common memories Mc to be used in common by each of the main members, the switching of the actual plant operation and the simulation operation can be substituted by only the data of the simulation PC, corresponding to the data of the off-lined partial or entire function of the process input-output device.

It is readily understood from the above description that, since the simulation PC for conducting the simulation of the actuators to be in the off-line state in the plant is added to the actual plant control system having the close coupling data transmission device connecting the main members including the simulation PC to one another, the simulation of the plant operation can be conducted in a safe and economical manner with superior operating effects.

Although the present invention has been described in its preferred embodiment with reference to the accompanying drawings, however, it is readily understood that the present invention is not restricted to the preferred embodiment of the present invention and that various changes and modifications of the present invention may be made by a person skilled in the art without departing from the spirit and scope of the present invention.

What is claimed is:

1. A plant control system comprising:
   first control means for controlling an operation of a plant;
   second control means for simulating operation of actuators of the plant, the second control means being off-line during the plant operation;
   process input-output means for interfacing input and output signals between the first control means and the plant;
   central processing means for controlling the plant operation and the simulation of the plant operation and for feeding operation results to the first and second control means;
   an operation desk for operating the plant and the simulation of the plant operation; and
   data transmission means including a close coupling data transmission device for transmitting signals among the first control means, the second control means, the process input-output means, the central processing means and the operation desk to facilitate a simulation operation by permitting only certain actuators of said plant to be simulated with other actuators of said plant remaining in operation,
   the close coupling data transmission device including transmission control devices for the first control means, the second control means, the process input-output means, the central processing means and the operation desk, and a transmission loop for connecting the transmission control devices to one another, the first control means including means for switching modes between plant operation and simulation of the plant operation.

2. The system of defined in claim 1, also including display means for displaying the plant operation and the simulation of the plant operation thereon.

3. The system as defined in claim 2, wherein the display means includes a programable display device.

4. The system as defined in claim 2, wherein the first control means, the second control means, the process input-output means, the central processing means, the operation desk and the display means are connected to the data transmission means via respective address converters.

5. The system as defined in claim 1, wherein each transmission control device includes a common memory having data areas corresponding to the first control means, the second control means, the process input-output means, the central processing means and the operation desk.

6. The system as defined in claim 1, wherein each of the first and second control means includes a programable controller.

7. The system as defined in claim 6, wherein the second control means includes a programable controller for a backup of the first control means.

* * * * *